Sept. 5, 1939.   C. B. SCHNEIBLE   2,172,132
RESILIENT RIVET AND METHOD OF SECURING RESILIENT BLANKET TO SUPPORT Filed Oct. 27, 1937

Inventor:
Claude B. Schneible,
By Britton, Wiles, Davies, Hirschl & Dawson
Attys.

Patented Sept. 5, 1939

2,172,132

UNITED STATES PATENT OFFICE 2,172,132

RESILIENT RIVET AND METHOD OF SECURING RESILIENT BLANKET TO SUPPORT

Claude B. Schneible, Chicago, Ill.

Application October 27, 1937, Serial No. 171,390

7 Claims. (Cl. 85—37)

This invention relates to a resilient rivet and to means and method of securing a resilient blanket to a backboard or support. The invention is obviously applicable to other uses.

An object of the invention is to provide a resilient rivet formed of rubber or other suitable springy material, the construction being such as to permit the ready insertion thereof in position and permitting a portion of the rivet to remain in expanded position to securely lock parts together. A further object is to provide simple, expeditious, and effective means for securing parts together and more particularly parts such as a resilient blanket to a rigid support or backing plate. A still further object is to provide new and simple methods for locking parts such as a rubber blanket or the like to a plate or back support formed of metal or other rigid material. Other specific objects and advantages will appear as the specification proceeds.

The invention is illustrated, in a preferred embodiment by the accompanying drawing, in which—

Figure 1:
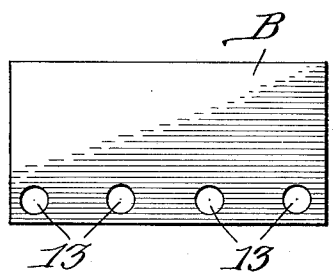
Figure 2:
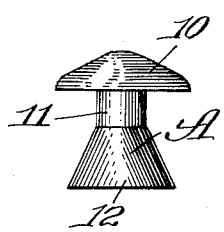
Figure 3:
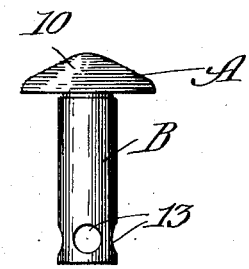
Figure 4:
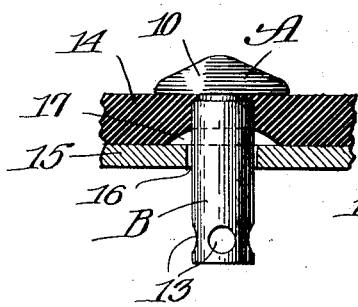
Figure 5:
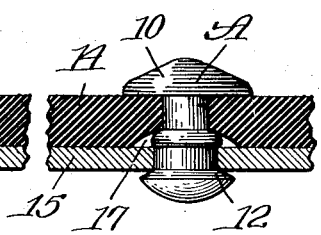

Figure 1 is a plan view of a metal strip which is utlized in compressing the rivet forming a part of my invention; Fig. 2, a side view in elevation of a rivet formed of rubber or other suitable resilient material; Fig. 3, a similar view of the rivet, the lower portion of the rivet being enclosed by the metal strip in Fig. 1; Fig. 4, a view similar to Fig. 3 of the rivet structure there shown, the rivet being extended through a portion of a resilient blanket and through an opening in a metal plate; Fig. 5, a view similar to Fig. 4, the metal strip, however, having been withdrawn and the lower portion of the rivet allowed to expand; and Fig. 6, a view similar to Fig. 5 but showing a modified form of the invention in which the rivet is equipped with a coil spring retaining member.

In the illustration given, A designates a resilient rivet, and B, a metal plate.

The rivet A may be of any suitable construction. I prefer to employ a resilient material, such as rubber because of its resistance to abrasive in sand blasting operations. The rivet is provided with a head portion 10, an intermediate neck portion 11, and a lower flared skirt portion 12. The metal strip B is formed of suitably bendable and yet sturdy metal which, when rolled about the compressed skirt portion 12 of rivet A, as illustrated in Fig. 3, is sufficiently strong to retain the skirt portion 12 in tubular compressed form. The lower portion of the metal strip B is provided with openings 13 which, when the strip is rolled about the lower portion of the rivet, are substantially diametrically opposed.

The structure just described is particularly useful in securing a blanket of rubber or other suitable material to a metal plate or support to provide a back stop for abrasive blasting operations. The head 10 of the rivet when secured in position effectively resists the wearing action of the abrasive and remains in position substantially as long as the rubber blanket itself is in use. In the illustration given, the blanket 14 of rubber or other suitable material is shown applied to a metal back plate 15, the plate 15 being provided with an aperture 16. The blanket 14 is shown provided with a depression 17 aligned with the opening 16. In the operation of the device, the structure, as illustrated in Fig. 3, is applied through an opening in the rubber blanket 14, passing through the recess 17 and the aperture 16 of the plate 15. The head 10 is brought flush against the top of the blanket 14. The operation of inserting the rivet is extremely simple because the metal sheath B provides a rigid tube of relatively small diameter. After the rivet has been inserted into the position shown in Fig. 4, the metal sheath B is removed by applying a prong instrument so as to engage diametrically opposed openings 13 and pulling on the tube. The metal sheath B readily slips off of the rivet, allowing the skirt portion 12 to expand within the opening 16 in plate 15 and also to expand within the recess 17. It will be observed that the skirt portion 12 flares outwardly on both sides of the plate 15, thus anchoring the rivet rigidly to the plate while at the same time maintaining the head 10 against the outer face of the blanket 14.

Figure 6:
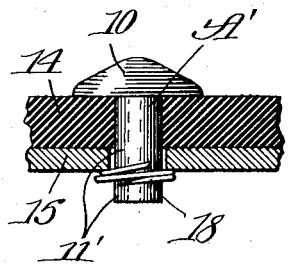

In the modification shown in Fig. 6, the rivet A' is provided with a head 10' and a straight shank portion 11'. The lower portion of the shank 11' is provided with a coil spring member 18 having a lower free end, the upper end of the spring being preferably integrally cast with the shank 11'. The coil spring can be readily threaded into the position shown in Fig. 6 so that the lower portion of the spring bears upwardly against the metal plate 15, thus anchoring the rivet rigidly against the plate. It will be understood that many other means may be readily employed in place of the spring 18 as a means for locking the rivet in the position shown.

Where rubber blankets are secured to back members by means of metal or other rigid rivets or fastening members, it is found that the heads of the rivets or other fastening members are rapidly worn away so that the blanket springs out of position. With the present construction, the resilient heads 10 effectively resist the abrasive and remain in effective contact with the blanket as long as the blanket can be used. By enclosing the expansive part of the rivet within a sheath of constricted cross-section, a rigid tube is produced which can be readily passed through openings in the blanket and plate and the head of the rivet is brought into tight sealing relation to the blanket by the tension which is exerted at the opposite end of the rivet when the sheath member is pulled off. Thus by a very simple operation, the rivet is locked in the desired position with the rivet head maintained snugly against the blanket and the skirt portion of the rivet locked against movement by expanded portions on each side of the plate.

While in the foregoing specification, I have set forth illustrative examples, it will be understood that these may be modified greatly while still employing the invention. The foregoing detailed description has been given for clearness of understanding only, and no unnecessary limitations should be understood therefrom, but the appended claims should be construed as broadly as permissible, in view of the prior art.

I claim:

1. In combination, a rivet having a head portion, a lower outwardly flared expansible portion secured to said head portion by a neck, and a sheath member enclosing said expansible portion and maintaining it releasably in compressed condition, forming an elongated body substantially equal to the cross section of the neck.

2. In combination, a rivet having a head portion, a lower outwardly flared expansible portion secured to said head portion, and a sheath member enclosing said expansible portion and maintaining it releasably in compressed condition, forming an elongated body of smaller cross section, said sheath member being equipped at its lower end with means for permitting the sheath to be drawn from the rivet.

3. In combination, a rivet having a head portion, a lower expansible portion secured to said head portion, and a sheath member enclosing said expansible portion and maintaining it releasably in compressed condition, forming an elongated body of smaller cross section, said sheath member being provided at its lower end with spaced openings.

4. In combination with a rubber rivet having an enlarged head portion and a lower outwardly flared skirt portion, a metal sheath rolled about said skirt portion and maintaining it in compressed condition therein, said metal member being provided at its lower end with at least one pair of diametrically opposed openings.

5. In a structure of the character set forth, a rigid support provided with an opening, a resilient blanket provided with an opening aligned with said first-mentioned opening, said blanket having also a recess at the rear side of its opening, and a rivet member having a resilient head portion and an outwardly flared retaining portion expanded within said opening of said support and providing retaining flanges at the rear of said plate and within said recess.

6. In a method of the character set forth, the steps of compressing an outwardly flared retaining portion of a head-equipped resilient rivet within a rigid tube of a cross section smaller than the cross section of said retaining portion, inserting the retaining portion of said rivet into an opening of a support, and then removing said tube to permit the retaining portion of said rivet to expand within said opening.

7. In a method for securing two members having aligned openings together by means of a rivet having a head portion and a resilient enlarged skirt portion, the steps of compressing said skirt portion within a rigid tube of smaller cross section than said skirt portion, inserting said tube into said aligned openings and then withdrawing said tube to permit said skirt portion to expand within at least one of said openings.

CLAUDE B. SCHNEIBLE.